(12) United States Patent
Hong et al.

(10) Patent No.: US 11,615,768 B2
(45) Date of Patent: Mar. 28, 2023

(54) DISPLAY APPARATUS, METHOD OF CONTROLLING THE SAME, AND DISPLAY SYSTEM

(71) Applicant: SAMSUNG ELECTRONICS CO., LTD., Suwon-si (KR)

(72) Inventors: Sae Rom Hong, Suwon-si (KR); Kook-Heon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 17/288,793

(22) PCT Filed: Oct. 31, 2019

(86) PCT No.: PCT/KR2019/014554
§ 371 (c)(1),
(2) Date: Apr. 26, 2021

(87) PCT Pub. No.: WO2020/096270
PCT Pub. Date: May 14, 2020

(65) Prior Publication Data
US 2022/0013091 A1 Jan. 13, 2022

(30) Foreign Application Priority Data
Nov. 9, 2018 (KR) .................. 10-2018-0137276

(51) Int. Cl.
*G09G 5/38* (2006.01)
*G06F 3/14* (2006.01)
*G09G 3/20* (2006.01)

(52) U.S. Cl.
CPC ............. *G09G 5/38* (2013.01); *G06F 3/1446* (2013.01); *G09G 3/20* (2013.01);
(Continued)

(58) Field of Classification Search
CPC ....... G09G 2356/00; G09G 2340/0492; G09G 2300/026; G09G 3/20; G09G 5/38; G06F 3/1446
See application file for complete search history.

(56) References Cited

U.S. PATENT DOCUMENTS

| | | |
|---|---|---|
| 8,102,333 B2 | 1/2012 | Kondo et al. |
| 9,547,467 B1 | 1/2017 | DeLuca et al. |

(Continued)

FOREIGN PATENT DOCUMENTS

| | | |
|---|---|---|
| KR | 10-2006-0113516 A | 11/2006 |
| KR | 10-2011-0058049 A | 6/2011 |

(Continued)

OTHER PUBLICATIONS

International Search Report (PCT/ISA/210) dated Mar. 3, 2020 issued by the International Searching Authority in counterpart International Application No. PCT/KR2019/014554.

(Continued)

*Primary Examiner* — Abbas I Abdulselam
(74) *Attorney, Agent, or Firm* — Sughrue Mion, PLLC

(57) ABSTRACT

The present disclosure provides a display apparatus capable of configuring layout information including rotation information of a display without user setting when a plurality of display apparatuses are connected, a method of controlling the display apparatus, and a display system. The display apparatus includes a display; a communication interface configured to communicate with at least one other display apparatus; and a controller configured to calculate position information of a display apparatus, to receive position information including rotation information of the at least one other display apparatus through the communication interface, and to output an output image signal to the display based on the position information of the display apparatus (Continued)

and the position information of the at least one other display apparatus.

18 Claims, 16 Drawing Sheets

(52) U.S. Cl.
CPC ............... *G09G 2300/026* (2013.01); *G09G 2340/0492* (2013.01); *G09G 2356/00* (2013.01)

(56) References Cited

U.S. PATENT DOCUMENTS

| | | | | |
|---|---|---|---|---|
| 2009/0322946 | A1* | 12/2009 | Kitashou | ............ H04N 21/4316 348/565 |
| 2010/0231608 | A1* | 9/2010 | Wang | ....................... G09G 5/34 345/659 |
| 2011/0122048 | A1 | 5/2011 | Choi et al. | |
| 2013/0271350 | A1 | 10/2013 | Lyons | |
| 2015/0286457 | A1 | 10/2015 | Kim et al. | |
| 2016/0133226 | A1* | 5/2016 | Park | ......................... G06F 3/01 345/1.3 |
| 2017/0003949 | A1* | 1/2017 | Gao | ....................... G06F 9/445 |
| 2019/0163241 | A1 | 5/2019 | Moon et al. | |

FOREIGN PATENT DOCUMENTS

| | | |
|---|---|---|
| KR | 10-2016-0054249 A | 5/2016 |
| KR | 10-2016-0058498 A | 5/2016 |
| WO | 2005/065180 A2 | 7/2005 |
| WO | 2017/222243 A1 | 12/2017 |

OTHER PUBLICATIONS

Communication dated Oct. 7, 2021 issued by the European Patent Office in European Application No. 19881861.9.

* cited by examiner

A multi-display is a device that allows a single screen to
DISPLAY APPARATUS, METHOD OF CONTROLLING THE SAME, AND DISPLAY SYSTEM

TECHNICAL FIELD

The present disclosure relates to a display apparatus in which a plurality of display apparatuses output an image, a method of controlling the same, and a display system.

BACKGROUND ART

A multi-display is a device that allows a single screen to be formed by a plurality of display apparatuses.

In general, the multi-display has the plurality of display apparatuses installed vertically and horizontally, and each of the plurality of display apparatuses displays a part of an entire screen to be displayed.

Conventionally, in order to output a single image on the multi-display, a separate device or process is required, such as setting a layout of each display through a manual setting process using a separate program or detecting a position of the display using a camera.

In particular, when a user fails to properly set up the plurality of display apparatuses through the separate process, the image to be output is not properly output, thereby causing a difficulty in smooth output of the image.

DISCLOSURE

Technical Problem

An aspect of the present disclosure is to provide a display apparatus capable of configuring layout information including rotation information of a display without user setting when a plurality of display apparatuses are connected, a method of controlling the display apparatus, and a display system.

Technical Solution

An aspect of the disclosure provides a display apparatus including: a display; a communication interface configured to communicate with at least one other display apparatus; and a controller configured to calculate position information of a display apparatus, to receive position information including rotation information of the at least one other display apparatus through the communication interface, and to output an output image signal to the display based on the position information of the display apparatus and the position information of the at least one other display apparatus.

The display apparatus according to claim 1, wherein the controller is configured to determine the position information of the display apparatus as reference position information, and to determine the position information of the other display apparatus based on the reference position information.

The display apparatus may further include a signal receiver configured to receive an input image signal.

The controller may be configured to determine layout information based on the position information of the display apparatus and the at least one other display apparatus, to determine the output image signal by changing the input image signal based on the layout information, and to transmit the output image signal to the at least one other display apparatus.

The controller may be configured to transmit a position information request signal to the at least one display apparatus.

The controller may be configured to determine the position information of the other display apparatus based on a transmission direction of the position information request signal.

In response to the layout information corresponding to the transmitted position information request signal being received in excess of a predetermined time, the controller may be configured to output a null signal corresponding to the transmitted position information request signal.

The controller may be configured to receive a position information request signal from the at least one other display apparatus.

The controller may be configured to determine the position information of the display apparatus based on a reception direction of the position information request signal from the at least one other display apparatus.

In response to the position information request signal being received, the controller may be configured to output a null signal in response to the position information request signal received after a time when the position information request signal is received.

The controller may be configured to determine the position information of the display apparatus based on the position information of the at least one other display apparatus.

The controller may be configured to transmit at least some of layout information derived based on the position information of the display apparatus and the position information of the other display apparatus to the at least one other display apparatus.

Another aspect of the disclosure provides a method of controlling a display apparatus including: communicating with at least one other display apparatus by a communication interface; determining, by a controller, position information of a display apparatus; receiving, by the controller, position information including rotation information of the at least one other display apparatus through the communication interface; and outputting, by the controller, an output image signal to a display based on the position information of the display apparatus and the position information of the at least one other display apparatus.

The method may further include determining, by the controller, the position information of the display apparatus as reference position information; and determining, by the controller, the position information of the other display apparatus based on the reference position information.

The method may further include receiving, by a signal receiver, an input image signal; and transmitting, by the controller, the output image signal to the at least one other display apparatus.

The determining of the output image signal may include determining layout information based on the position information of the display apparatus and the at least one other display apparatus; and determining the output image signal by changing the input image signal based on the layout information.

The method may further include transmitting, by the controller, a position information request signal to the at least one display apparatus.

The method may further include determining, by the controller, the position information of the other display apparatus based on a transmission direction of the position information request signal.

The method may further include, in response to the layout information corresponding to the transmitted position information request signal being received in excess of a predetermined time, outputting, by the controller, a null signal corresponding to the transmitted position information request signal.

The method may further include receiving, by the controller, a position information request signal from the at least one other display apparatus.

The determining of the position information of the display apparatus may include determining the position information of the display apparatus based on a reception direction of the position information request signal from the at least one other display apparatus.

The method may further include, in response to the position information request signal being received, outputting, by the controller, a null signal in response to the position information request signal received after a time when the position information request signal is received.

The determining of the position information of the display apparatus may include determining the position information of the display apparatus based on the position information of the at least one other display apparatus.

The method may further include transmitting, by the controller, at least some of layout information derived based on the position information of the display apparatus and the position information of the other display apparatus to the at least one other display apparatus.

Another aspect of the disclosure provides a display system including: a first display apparatus; and a second display apparatus. The first display apparatus may receive an input video signal, determine first display position information as reference position information, transmit a position information request signal to the second display apparatus, receive layout information including position information of the second display apparatus and the other display apparatus from the second display apparatus, derive an output image signal by changing the input image signal based on the layout information, output the output image signal, and transmit the output image signal to the second display apparatus. The second display apparatus may receive the position information request signal from the first display apparatus, determine the position information of the second display apparatus based on the reference position information, transmit the layout information including the position information of the second display apparatus and the other display apparatus, and receive and output the output image signal.

Advantageous Effects

According to a display apparatus, a method of controlling the display apparatus, and a display system of an embodiment, when a plurality of display apparatuses are connected, layout information including rotation information of a display may be configured without user setting.

MODES OF THE INVENTION

Figure 1:
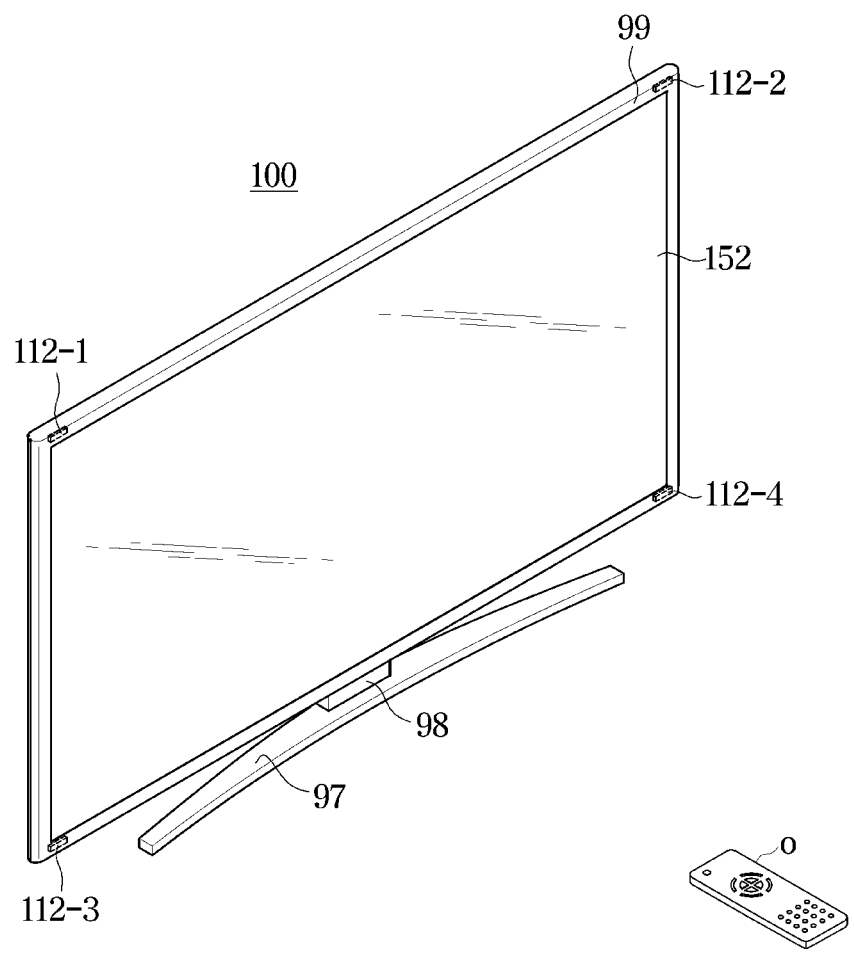
FIG. 1 is an external view illustrating a display apparatus according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "— part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

FIG. 1 is an external view illustrating a display apparatus according to an embodiment.

Referring to FIG. 1, a display apparatus 100 according to an embodiment may include an exterior housing 99, a display panel 152, a support 98, and a leg 97.

The exterior housing 99 defines an exterior appearance of the display apparatus 100 and includes components of the display apparatus 100 used to display various images or perform various functions. The exterior housing 99 may be formed as a single piece or as a combination of a plurality of housings, e.g., a combination of a front housing and a rear housing. An intermediate housing may further be provided inside the exterior housing 99.

The display panel 152 may be provided on the front surface of the exterior housing 99 and display various images. Particularly, the display panel 152 may display at least one or more still images or moving images. The display panel 152 may also be implemented using separate components such as a touch panel, depending on an embodiment.

The support 98 serves to connect the exterior housing 99 with the leg 97 while supporting the exterior housing 99. The support 98 may have various shapes according to designer's selection or may be omitted, depending on an embodiment. The support 98 may be attached to or detached from the exterior housing 99, depending on an embodiment. In addition, the display apparatus 100 may include at least one antenna 112-1 to 112-4.

The leg 97 may be connected to the support 98 such that the exterior housing 99 is stably mounted on the floor. The leg 97 may be coupled to or separated from the support 98, depending on an embodiment. The leg 97 may be directly connected to the exterior housing 99. According to another exemplary embodiment, the leg 97 may be omitted.

Figure 2:
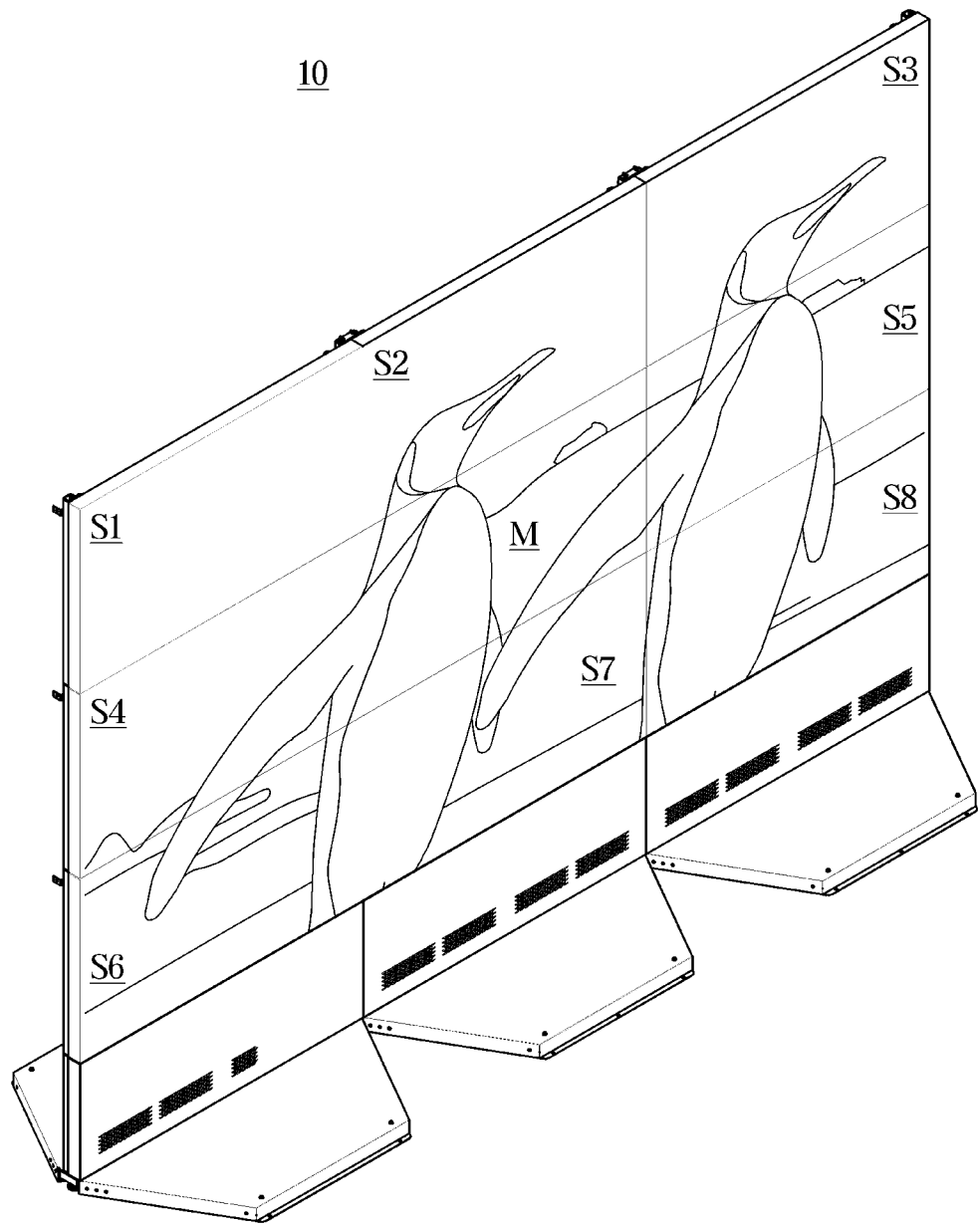
FIG. 2 is a view illustrating outputting an image from a plurality of display apparatuses according to an embodiment.

FIG. 2 is a view illustrating outputting an image from a plurality of display apparatuses according to an embodiment.

Referring to FIG. 2, it illustrates that a plurality of display apparatuses are connected to output an image. Among the plurality of display apparatuses, a master display apparatus M may receive an image signal from the outside and transmit a signal to be output by each display apparatus. Meanwhile, when the master display apparatus transmits signals to be output by each display apparatus S1 to S8, a positional relationship between the master display apparatus and each display apparatus, a position of each display apparatus, and a rotation angle of each display apparatus may be considered. Hereinafter, an operation of outputting the image based on layout information based on position information of each display apparatus will be described in detail.

Figure 3:
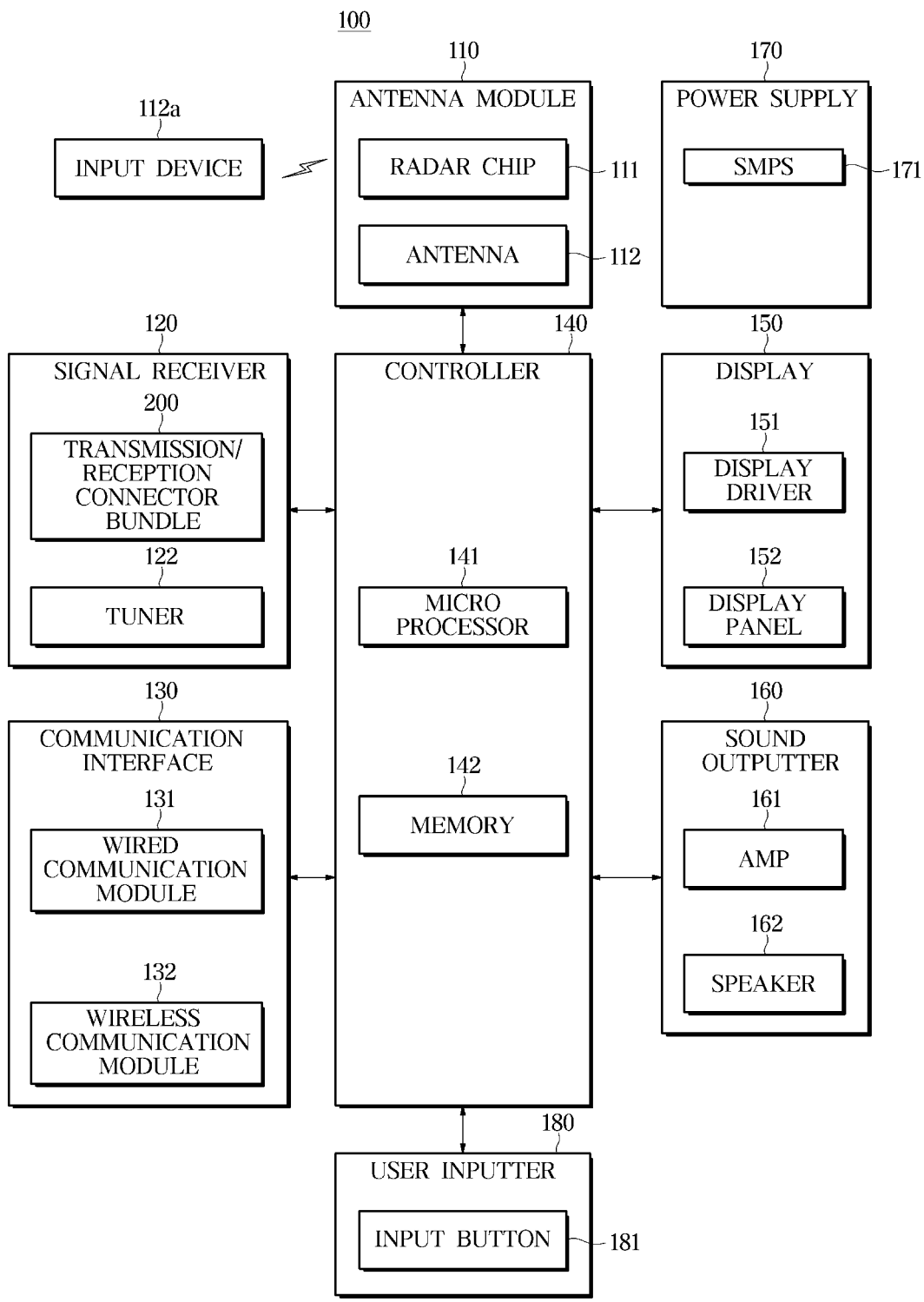
FIG. 3 is a control block diagram of a display apparatus according to an embodiment.

FIG. 3 is a control block diagram of a display apparatus according to an embodiment.

Referring to FIG. 3, the display apparatus 100 may include an antenna module 110 to receive a signal from an input device 112a, a user inputter 180 to receive a user's input from a user, a communication interface 130 (e.g., a transceiver) to communicate with an external device 130, a controller 140 to control the operation of the display apparatus 100 and process video signals and/or audio signals received from a signal receiver 120 and/or the communication interface 130, a display 150 to display an image processed by the controller 140, a sound outputter 160 to output sound processed by the controller 140, and a power supply 170 to supply power to the components of the display apparatus 100.

The antenna module 110 may include a radar chip 111 capable of transmitting and receiving a signal composed of a specific pulse component of a predetermined frequency band.

The display apparatus 100 may receive a user input regarding a change of an image source device 120 or 130 through an antenna 112.

The controller 140 may receive position information including rotation information of the at least one other display apparatus through the communication interface 130.

As will be described later, the position information may include rotation information of the other display apparatus, coordinate information (for example, x, y index) of the other display apparatus, and information related to a combination position of the display apparatus 100 and the other display apparatus.

The controller 140 may control the display 150 to output an output image signal determined based on position information of the display apparatus 100 and the at least one other display apparatus.

The controller 140 may determine its own display position information as reference position information, and may determine position information of the other display apparatus based on the reference position information. The reference position information may include x, y index information of the corresponding display apparatus and rotation information of the corresponding display apparatus.

According to another embodiment, the controller 140 of the master display apparatus may determine its own position based on the obtained layout information for the entire display apparatus, as described later.

The controller 140 may determine layout information based on the position information of the display apparatus 100 and the at least one other display apparatus.

The layout information may refer to information including a relationship between a display and another display and each position information.

The controller 140 may determine the output image signal by changing an input image signal based on the layout information, and may transmit the output image signal to the at least one other display apparatus. Particularly, the controller 140 may change the input image signal received through the signal receiver 120 to correspond to at least one display apparatus with the determined layout information, and may transmit the changed output image signal to each other display apparatus.

The controller 140 may transmit a position information request signal to at least one display apparatus. The other display apparatus that has received the position information request signal may determine its own position information based on a reception direction of the position information request signal.

When receiving the position information request signal, the controller 140 may output a null signal corresponding to the position information request signal received after a time when the position information request signal is received. That is, when receiving a plurality of position information, the controller 140 of the display apparatus 100 may ignore the position information request signal received at a later point in time, and may output the null signal (a signal including a null column) in response to the position information request signal, for example. According to an embodiment, the null signal may be implemented as a signal capable of disregarding communication with other displays.

The controller 140 may determine the position information of the display apparatus 100 based on the position information of at least one other display apparatus. According to the embodiment, the other display apparatus may be the master display apparatus, and the display apparatus 100 may determine its own position information based on the reference position information of the master display apparatus.

The controller 140 may transmit at least some of the layout information derived based on the position information of the display apparatus 100 and the position information of the other display apparatus 100 to at least one other display apparatus.

The layout information may include information related to connection between the display and another display, and may include the position information of each display apparatus.

The controller 140 may process image frame data and/or video/audio signals received by the signal receiver 120 and/or the communication interface 130. For example, the controller 140 may output the image frame data received from the signal receiver 120 to the display 150. In addition, the controller 140 may process the video/audio signals received by the signal receiver 120 and/or the communication interface 130, and may output the image frame data generated from the video/audio signals to the display 150.

The controller 140 may control the operations of the signal receiver 120, the display 150, and the sound outputter 160 according to the operation state of the display apparatus 100 and/or a user input. For example, when a content source is selected by a user input, the controller 140 may control the signal receiver 120 to receive image frame data from the selected content source. In addition, when the image frame data is not received through the signal receiver 120, the controller 140 may control the signal receiver 120 to receive image frame data from another content source.

In particular, the controller 140 may output a selection signal for selecting a source from which to receive image frame data to a transmission/reception connector bundle 200 of the signal receiver 120. The controller 140 may include a microprocessor 141 and a memory 142.

The memory 142 may store programs and data for processing image frame data and/or video/audio signals, and may temporarily memorize data generated during processing of the image frame data and/or video/audio signals. In addition, the memory 142 may store programs and data for controlling the components included in the display apparatus 100 and temporarily memorize data generated during the control of the components included in the display apparatus 100.

The memory 142 may include a non-volatile memory for storing data for a long time, such as a read only memory (ROM) and a flash memory, and a volatile memory for temporarily memorizing data, such as a static random access memory (S-RAM), Dynamic Random Access Memory (D-RAM).

The microprocessor 141 may receive image frame data and/or video/audio signals from the signal receiver 120 and/or the communication interface 130. The microprocessor 141 may output the image frame data received from the signal receiver 120 to the display 150 and the sound outputter 160. In addition, the microprocessor 141 may decode the video signal to generate image frame data, decode the audio signal to generate sound data, and output the image frame data and sound data to the display 150 and the sound outputter 160, respectively.

The microprocessor 141 may receive a user input from the user inputter 180, and controls a control signal for controlling the signal receiver 120 and/or the display 150 and/or the sound outputter 160 according to the user input. In addition, the microprocessor 141 may generate a control signal for controlling the operation of the signal receiver 120 according to whether image frame data is received through the signal receiver 120.

The microprocessor 141 may include an arithmetic circuit that performs logical operations and arithmetic operations, and a memory circuit that memorizes calculated data.

The controller 140 may convert sound data decoded from the audio signal into an analog acoustic signal, and an amplifier 161 may amplify the analog sound signal output from the controller 140.

The user inputter 180 may include an input button group 181 that receives a user input.

For example, the user inputter 180 may include a power button for turning on or off the display apparatus 100, a channel selection button for selecting broadcast content displayed on the display apparatus 100, a sound control button for adjusting the volume of the sound output from the display apparatus 100, a source selection button for selecting a content source, and the like.

The input button group 181 may receive respective user inputs and output electrical signals corresponding to the user inputs to the controller 140. The input button group may be implemented using various input devices, such as a push switch, a touch switch, a dial, a slide switch, a toggle switch, and the like.

The tuner 122 may receive a broadcast signal from a broadcast reception antenna or a wired cable, and extract a broadcast signal of a channel selected by a user from among the broadcast signals. For example, the tuner 122 may pass a broadcast signal having a frequency corresponding to a channel selected by a user among a plurality of broadcast signals received through the broadcast reception antenna or the wired cable, and block a broadcast signal having a different frequency.

As such, the signal receiver 120 may receive image frame data and/or video/audio signals through the transmission/reception connector bundle 200 and/or the tuner 122, and output the image frame data and/or video/audio signals received through the transmission/reception connector bundle 200 and/or the tuner 122 to the controller 140.

The communication interface 130 may include a wired communication module 131 and a wireless communication module 132 that may exchange data with external devices.

The communication interface 130 may communicate with at least one other display apparatus 100. Particularly, the communication interface 130 may transmit and receive a position information request signal, the position information, the null signal, and the layout information with at least one other display apparatus 100.

The wired communication module 131 may be connected to a communication network through a cable and exchange data with an external device through the communication network. For example, the wired communication module 131 is connected to a communication network through Ethernet (Ethernet, IEEE 802.3 technology standard), and exchanges data with first and second image source devices 120 and 130 and/or external devices through the communication network.

The wireless communication module 132 may wirelessly communicate with an access point (AP), and connect to a communication network through the AP and exchange data with the first and second image source devices 120 and 130 and/or the external devices through the communication network. For example, the wireless communication module 132 may communicate with the AP through Wi-Fi (WiFi™, IEEE 802.11 technology standard), Bluetooth (Bluetooth™, IEEE 802.15.1 technology standard), ZigBee™ (IEEE 802.15.4 technology standard). The wireless communication module 132 may exchange data with an external device through the AP.

The communication interface 130 may receive image frame data through the communication network.

The display 150 may include a display panel 152 for visually displaying an image, and a display driver 151 for driving the display panel 152.

The display panel 152 may generate an image according to image data received from the display driver 151 and display the image.

The display panel 152 may include a pixel that serves as a unit for displaying an image. Each pixel may receive an electrical signal representing an image from the display driver 151, and output an optical signal corresponding to the received electrical signal. As such, optical signals output from a plurality of the pixels are combined so that one image may be displayed on the display panel 152.

The display driver 151 may receive image data from the controller 140 and drive the display panel 152 to display an image corresponding to the received image data. Particularly, the display driver 151 may transmit an electrical signal corresponding to image data to each of a plurality of pixels constituting the display panel 152.

When the display driver 151 transmits an electrical signal corresponding to image data to each pixel constituting the display panel 152, each pixel outputs light corresponding to the received electrical signal, and light output from each pixel is combined to form an image.

The sound outputter 160 includes the amplifier 161 for amplifying sound, and the speaker 162 for acoustically outputting the amplified sound.

The speaker 162 may convert the analog acoustic signal amplified by the amplifier 181 into sound (a sound wave). For example, the speaker 182 may include a thin film that vibrates according to an electrical acoustic signal, and sound waves may be generated by the vibration of the thin film.

The power supply 170 may supply power to the user inputter 180, the signal receiver 120, the communication interface 130, the controller 140, the display 150, the sound outputter 160, and all other components.

The power supply 170 may include a switching mode power supply 171 (hereinafter, referred to as 'SMPS').

The SMPS 171 may include an AC-DC converter that converts AC power of an external power source into DC power, and a DC-DC converter that changes the voltage of the DC power. For example, AC power of an external power source is converted to DC power by the AC-DC converter, and the voltage of the DC power may be changed to various voltages (for example, 5V and/or 15V) by the DC-DC converter. The DC power with varying voltages may be supplied to the user inputter 180, the signal receiver 120, the controller 140, the display 150, the sound outputter 160, and all other components.

In addition, the transmission/reception connector bundle 200 may include a switch part for selecting source of image frame data.

At least one component may be added or omitted to correspond to the performances of the components of the display apparatus illustrated in FIG. 2. In addition, it would be understood by those skilled in the art that the mutual positions of the components may be changed to correspond to the performance or structure of the system.

Meanwhile, the components illustrated in FIG. 2 may refer to a software component and/or a hardware component, such as a Field Programmable Gate Array (FPGA) and an Application Specific Integrated Circuit (ASIC).

Figure 4:
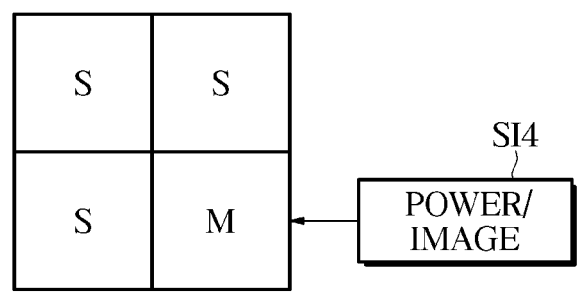
FIGS. 4 and 5 are views for describing a relationship between a master display apparatus and a slave display apparatus according to an embodiment.
Figure 5:
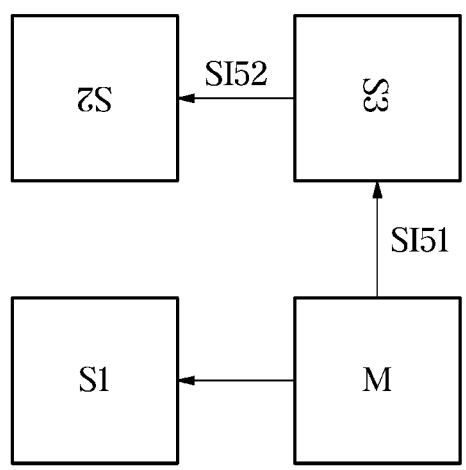

FIGS. 4 and 5 are views for describing a relationship between a master display apparatus and a slave display apparatus according to an embodiment.

Meanwhile, the master display apparatus M and the slave display apparatuses S1 to S8 described below may constitute a display system 10 according to the embodiment.

Referring to FIG. 4, the master display apparatus M may receive a power and image signal SI4 from the outside. The plurality of display apparatuses including the master display apparatus M may distribute and output the single image signal to each display apparatus S.

Particularly, each display apparatus S may transmit and receive data to and from the surrounding display apparatuses. According to the embodiment, each display apparatus may transmit and receive the data to and from display apparatuses located up, down, left and right.

Referring to FIG. 5, it illustrates that the master display apparatus M transmits data SI51 to the slave display apparatuses S1, S2, and S3 and that the slave display apparatus S3 transmits data SI2 to the other slave display apparatus S2.

The data transmitted/received between the display apparatuses may be image signals received from an external source by the master slave. In addition, the data transmitted and received between the display apparatuses may be the layout information including the position information and the position information of each display.

Meanwhile, as described later, the master display apparatus may change the input image signal received from the outside to correspond to each display based on the layout information.

Figure 6:
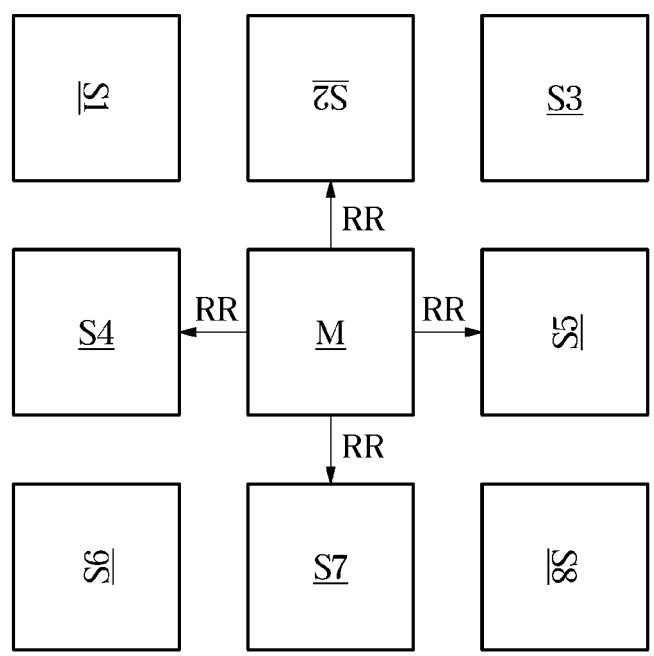
FIGS. 6 to 8 are views for describing an operation related to a position information request signal of a display apparatus according to an embodiment.
Figure 7:
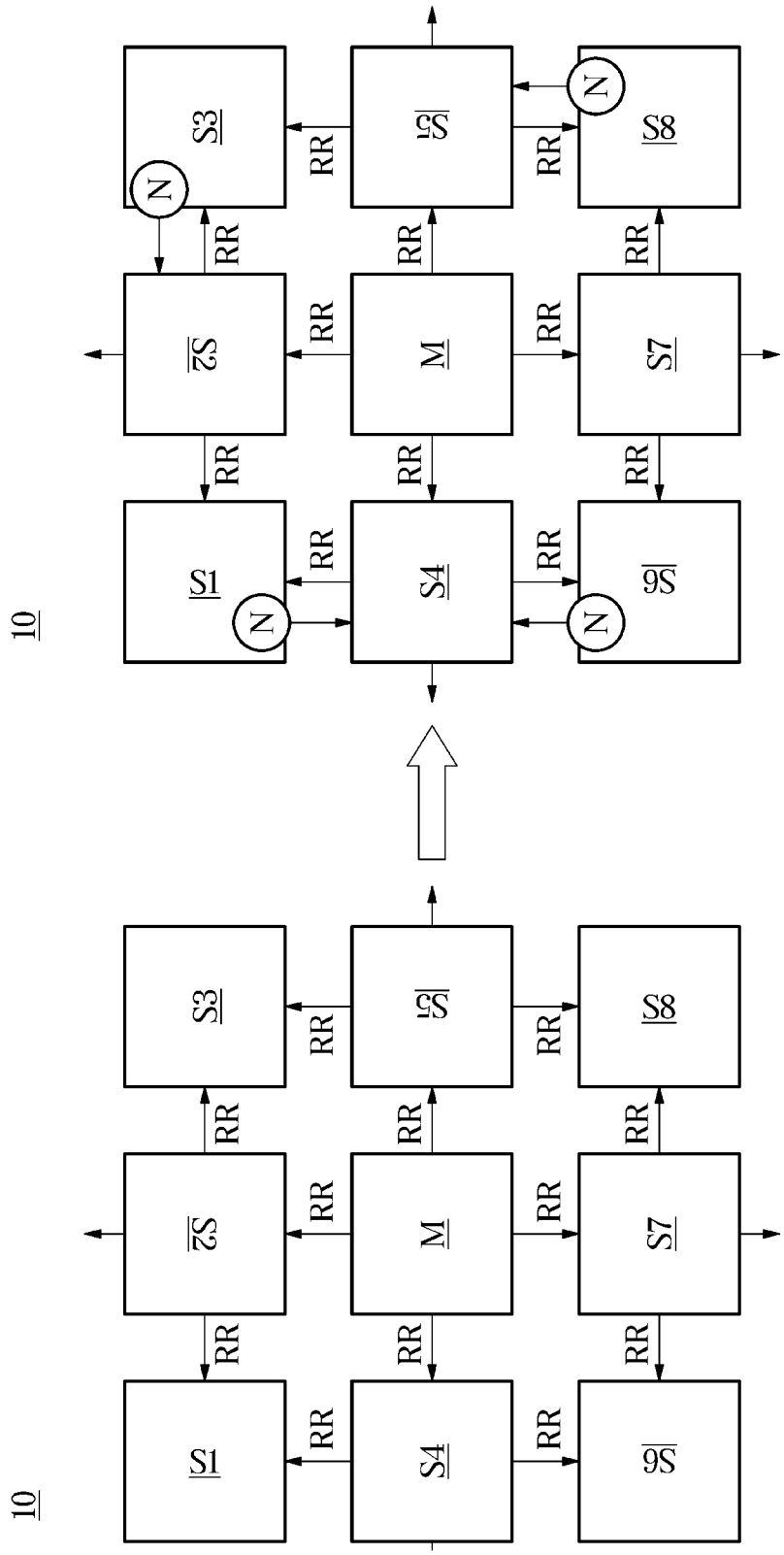
Figure 8:
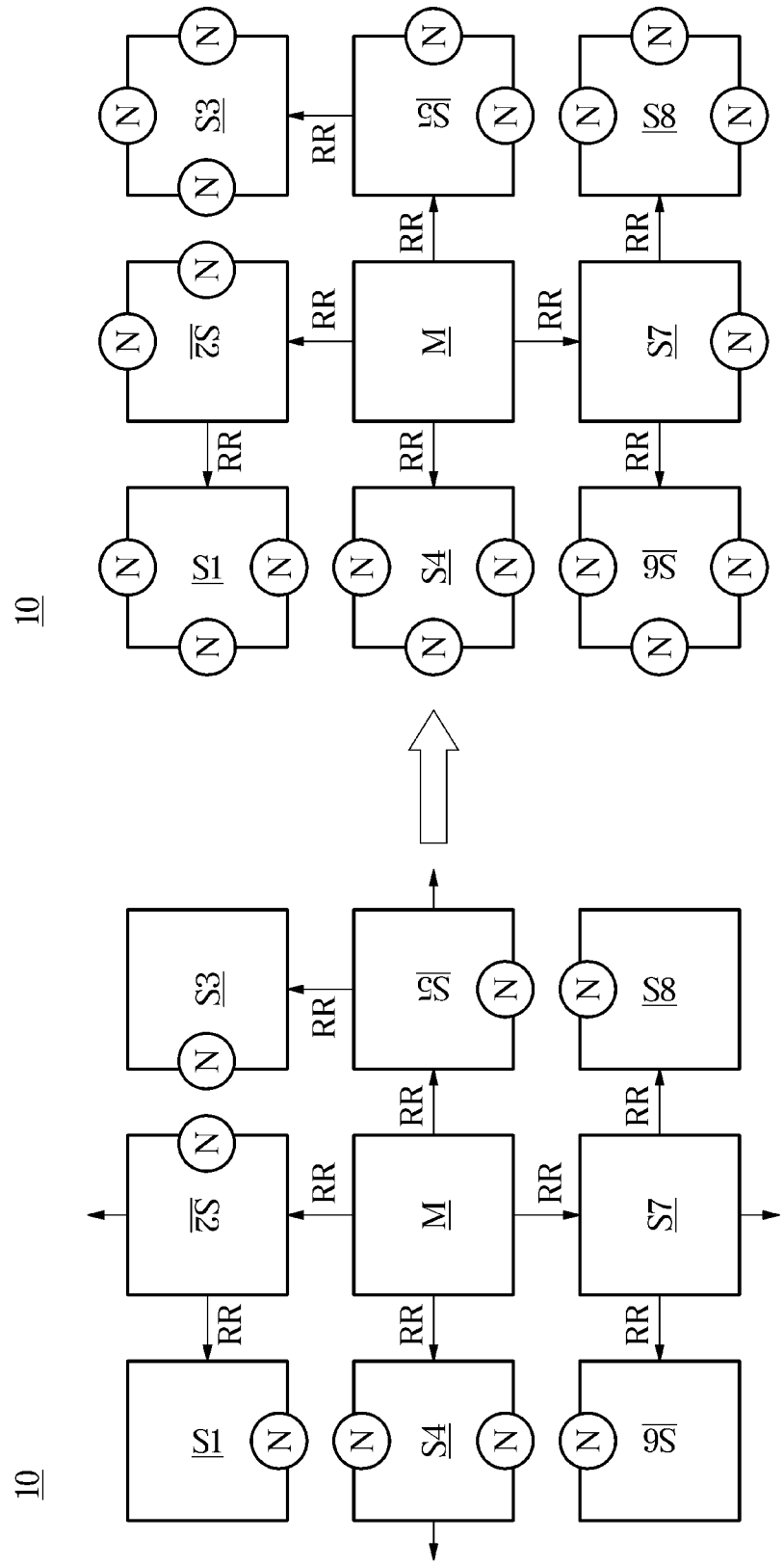

FIGS. 6 to 8 are views for describing an operation related to a position information request signal of a display apparatus according to an embodiment.

The display apparatuses illustrated in FIGS. 6 to 8 are indicated by S1 to S8 and the master display apparatus is indicated by M, respectively.

Referring to FIG. 6, FIG. 6 illustrates that the master display apparatus transmits a position information request signal RR. In FIG. 6, the master display apparatus may transmit the position information request signal RR in four directions. Meanwhile, the slave display apparatus, which has received the position information request signal from the master display apparatus, may transmit a response signal including the layout information to the master display apparatus, as described later.

Referring to FIG. 7, the slave display apparatus receiving the position information request signal RR from the master display apparatus may transmit the position information request signal RR to the other slave display apparatus. Meanwhile, the slave display apparatus may not transmit the position information request signal again in a direction in which the position information request signal is received from the master display apparatus. For example, the slave display apparatus S5 may transmit the position information request signal RR to the slave display apparatuses S3 and S8 located around it.

Meanwhile, the slave display apparatus S3, S8, S6, and S1 that have received the position information request signal from S5, S4, S7 and S2 after each slave display apparatus transmits the position information request signal through the above-described operation may receive the position information request signal RR from the other slave display apparatus.

For example, S3 may receive the position information request signal from S5, and may receive the position information request signal from S2. In this case, S3 may output the null signal N in response to the position information request signal received later. FIG. 7 illustrates that S3 outputs the null signal N in the direction corresponding to S2. Each display apparatus may not transmit the layout information to be described later, its own position information, and the position information of the other display apparatus in a direction in which the null signal N is output. In addition, when the display apparatus 100 outputs the null signal N to the other display apparatus, the other display apparatus may output the null signal N corresponding thereto. For example, when S3 outputs the null signal N in response to the position information request signal received at a time late to S2, S2 may output the corresponding null signal N.

Referring to FIG. 8, it is illustrated that each display apparatus outputs the null signal N, and a corresponding slave apparatus outputs the null signal N in the above-described manner.

Meanwhile, each display apparatus may transmit the position information request signal RR and output the null signal N when the layout information corresponding to the position request information signal is not received for a predetermined time. For example, among the display apparatuses located at the periphery of the plurality of display apparatuses, S1 may transmit the position information request signal RR from S4 and S2, and may output the null signal N to the signal corresponding to a late received position information request signal. S1 may later transmit the position information request signal RR to the other directions SS1 and SS2. Meanwhile, since the display apparatus does not exist in the SS1 and SS2 directions, the signal may not be received, and S1 may output the null signal N in the corresponding direction in response thereto. On the other hand, such an operation may be applied equally to S1, S3, S4, S5, S6, S7 and S8, and each display apparatus may output the null signal N corresponding to a direction in which the display apparatus does not exist.

In summary, the master display apparatus M may transmit the position information request signal RR to the slave display apparatus, and the slave display apparatus may also transmit the position information request signal RR to a nearby display apparatus.

In addition, the display apparatus that has received the plurality of position information request signals may output the null signal N in response to the position information request signal received at a later point in time, and the other display apparatus corresponding to the output of the null signal may also output the null signal N corresponding thereto.

In addition, the display apparatus that receives layout information derived by an operation to be described later exceeding a predetermined time may output the null signal in response thereto.

In addition, although the 3×3 display apparatus is described in FIGS. 6 to 8, there is no limitation on the arrangement or number of display apparatuses, and there is no limitation on data transmitted and received between each display apparatus.

Figure 9:
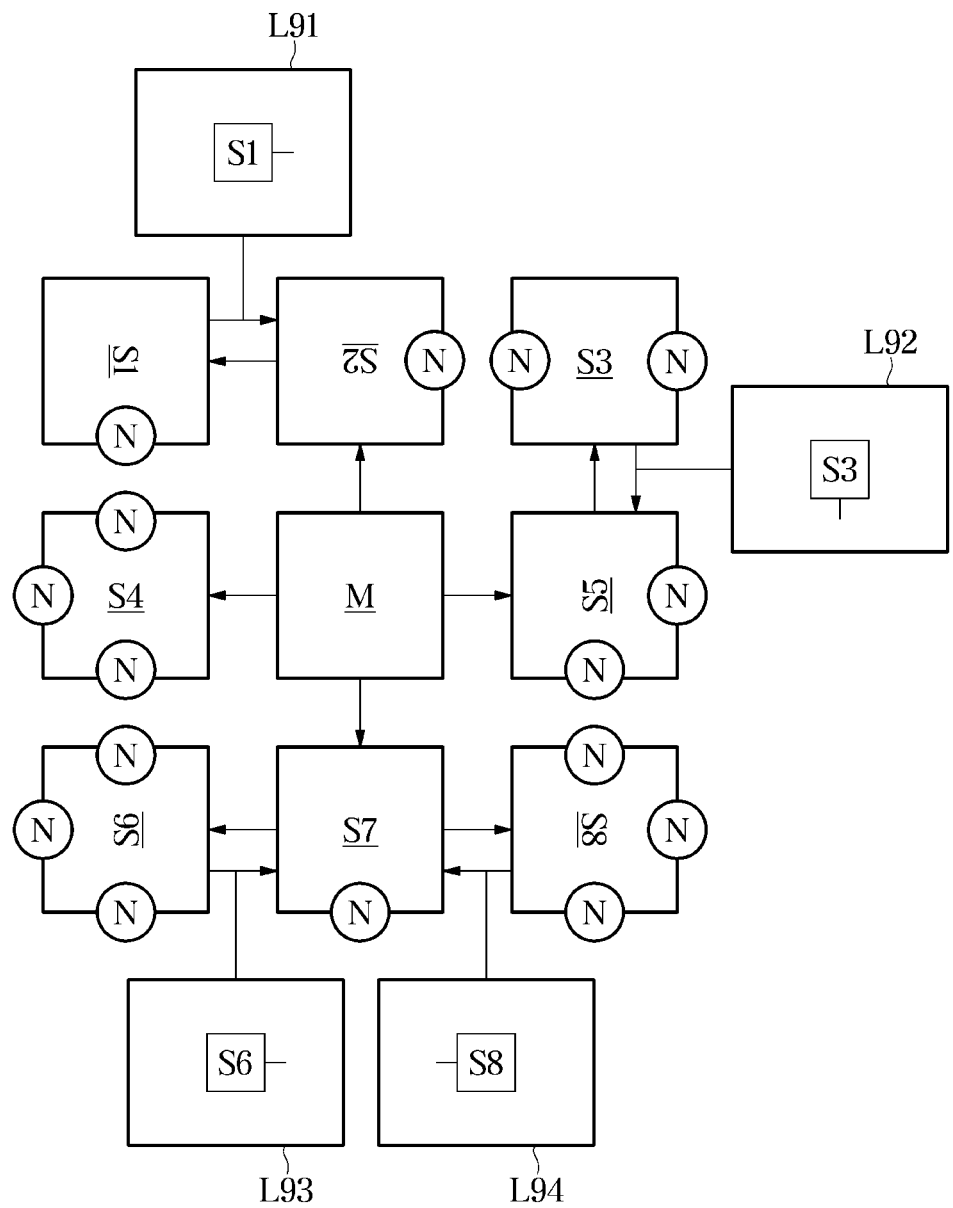
FIGS. 9 to 10 are views for describing an operation of determining layout information according to an embodiment.
Figure 10:
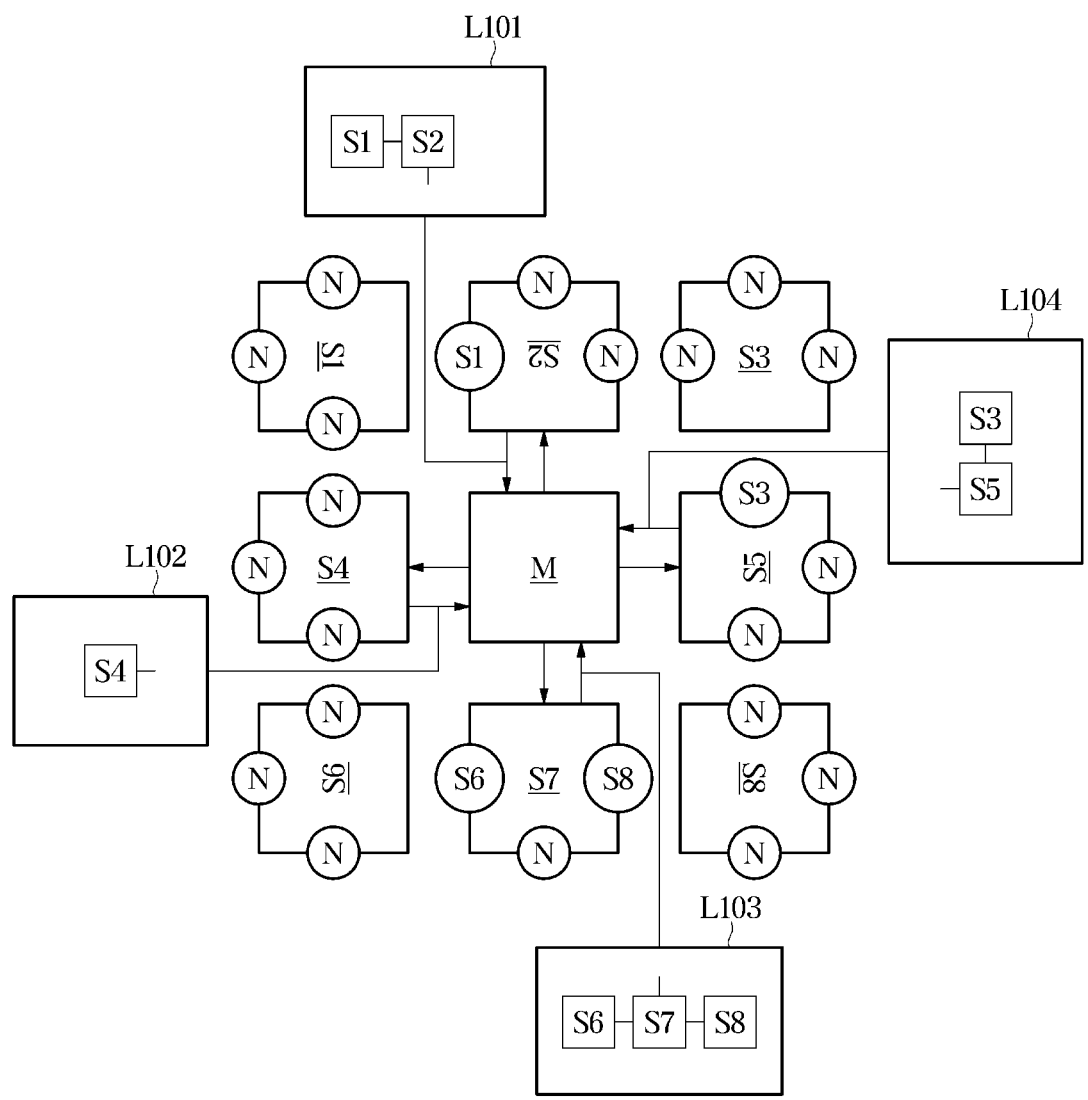

FIGS. 9 to 10 are views for describing an operation of determining layout information according to an embodiment.

Referring to FIG. 9, the slave display apparatus S2, S4, S5, or S7 that has received the position information request signal RR from the master display apparatus may transmit the position information request signal to other display apparatuses, and the slave display apparatus that has received the position request signal may transmit layout information L91, L92, L93, and L94 including its position information.

For example, S5 receiving the position information request signal RR from the master display apparatus may transmit the position information request signal RR to S3. In addition, S5 may receive the layout information L92 including the positional relationship between S5 and S3 from S3.

Meanwhile, referring to FIG. 10, S5 receiving the layout information from S3 may generate the layout information including the positional relationship between itself and the master display apparatus, and may transmit the generated layout information L104 to the master display apparatus M.

Meanwhile, this operation may be performed in S2, S4 and S7 adjacent to the master display apparatus. Meanwhile, the master display apparatus may generate all layout information L101, L102, L103, and L104 including the positional relationship determined by the above-described method.

The layout information generated in FIG. 10 may include the positional relationship between the master display apparatus and the other slave display apparatus, and the positional relationship between the slave display apparatuses. In addition, the layout information may include the position information of each display apparatus determined by a method to be described later.

On the other hand, the layout information determined in FIG. 10 is only an example of the present disclosure, and of course, it goes without saying that other layout information may be generated based on the flow of other data and before and after the position information request signal.

Figure 11:
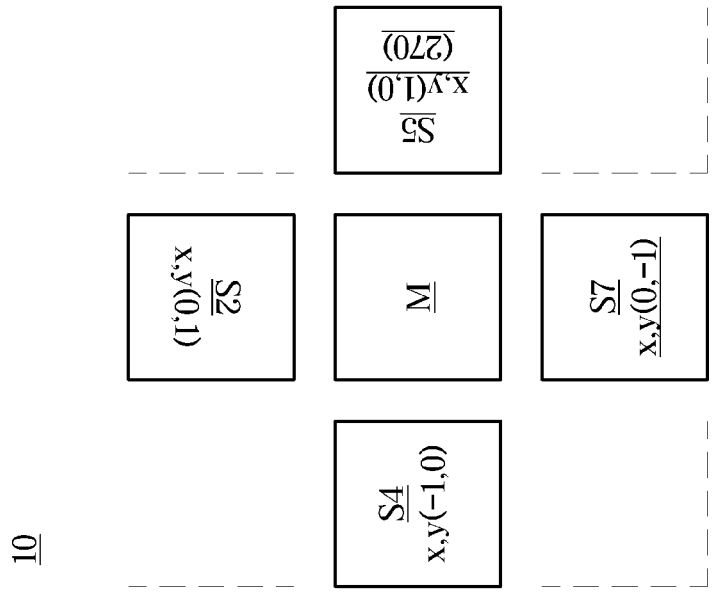
FIGS. 11 to 12 are views for describing an operation of deriving position information according to an embodiment.
Figure 11:
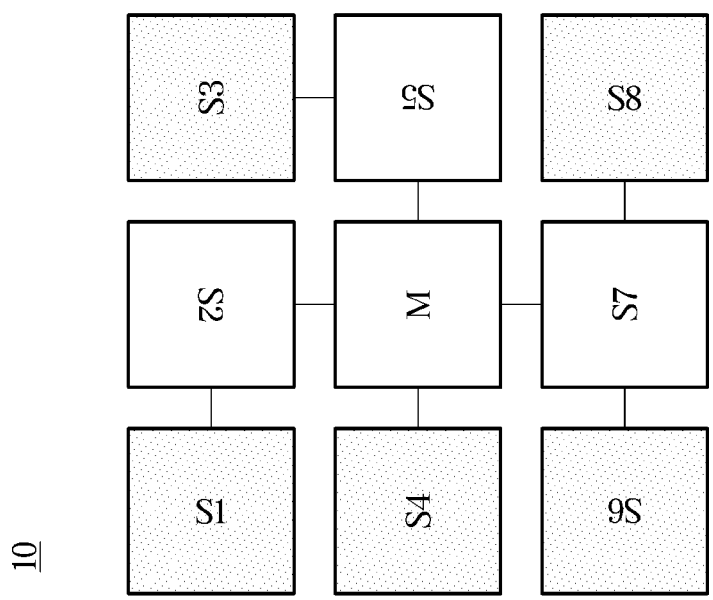
Figure 12:
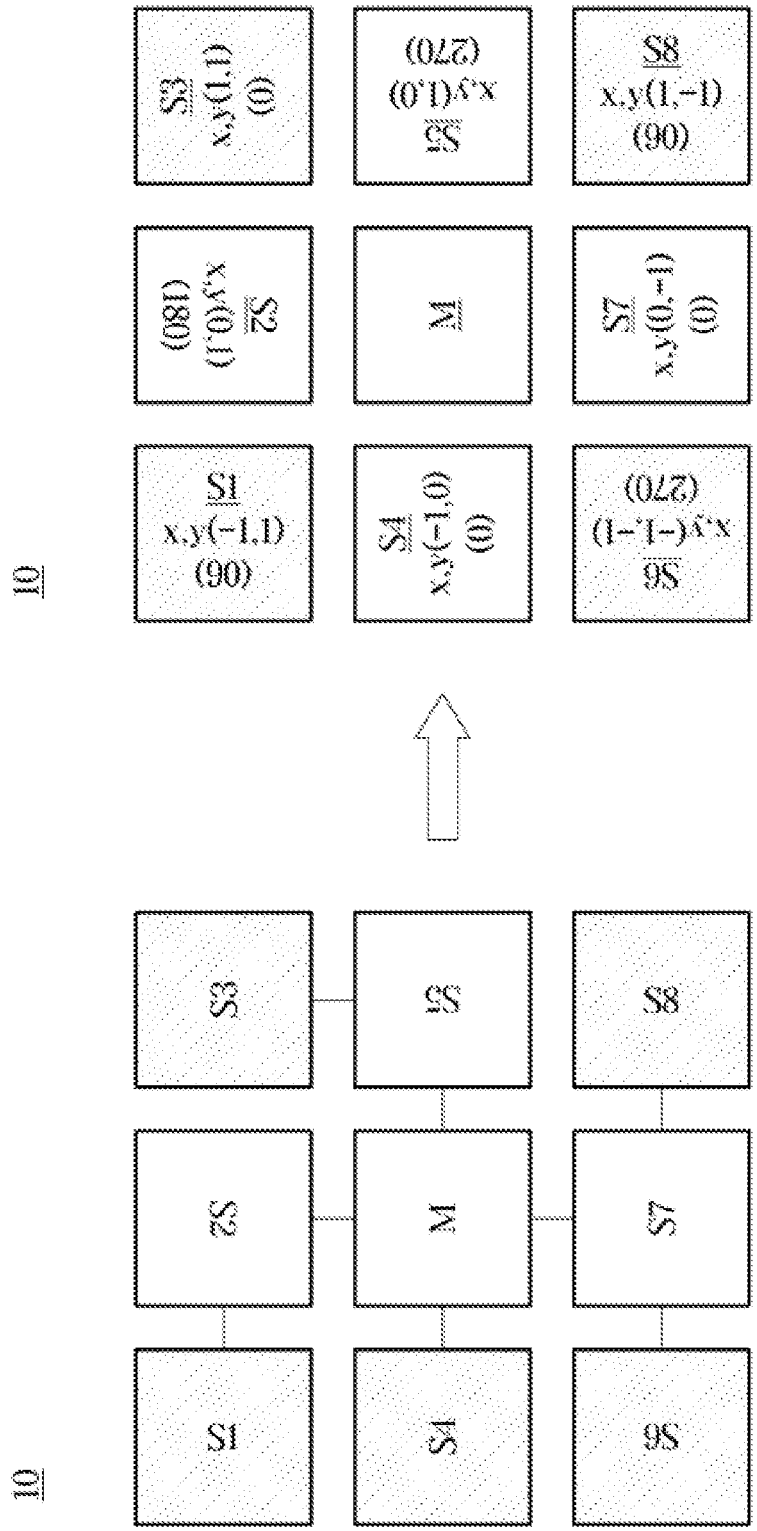

FIGS. 11 to 12 are views for describing an operation of deriving position information according to an embodiment.

Referring to FIG. 11, the master display apparatus M may determine its own position as a reference position. Also, the master display apparatus M may transmit its position information to each slave display apparatus.

Meanwhile, the position information may include its own xy index and rotation information. Also, depending on the embodiment, a direction for receiving the position information request signal or a direction for receiving the position information may be included in the position information.

In FIG. 11, the master display apparatus may determine its own position as the reference position, determine the xy index as (0, 0), and determine the position information as not rotating (0). Meanwhile, the rotation information may be defined as an angle rotated clockwise with respect to the master display apparatus.

For example, the S5 is located to a right of one coordinate of the master display apparatus and rotates 270 degrees compared to the master display apparatus. In addition, since S5 has received the position signal of the master display apparatus from the right, it may determine its position information as (1, 0) and (270).

Referring to FIG. 12, S3 may receive the position information from S5. S3 may receive the position information of S3 from below, and based on this, may derive its own position information. S3 is located above S5 and includes the rotation information such as the master display apparatus, so it may determine its position information as (1, 1) and (0).

Meanwhile, the controller of each display apparatus may directly transmit the position information derived by the above-described method to the surrounding slave display apparatuses, and may transmit the position information to each display apparatus including the position information in the layout information.

Meanwhile, determining the position information of each display apparatus described in FIGS. 11 and 12 is only an embodiment of the present disclosure, and detailed information included in the position information is not limited.

Figure 13:
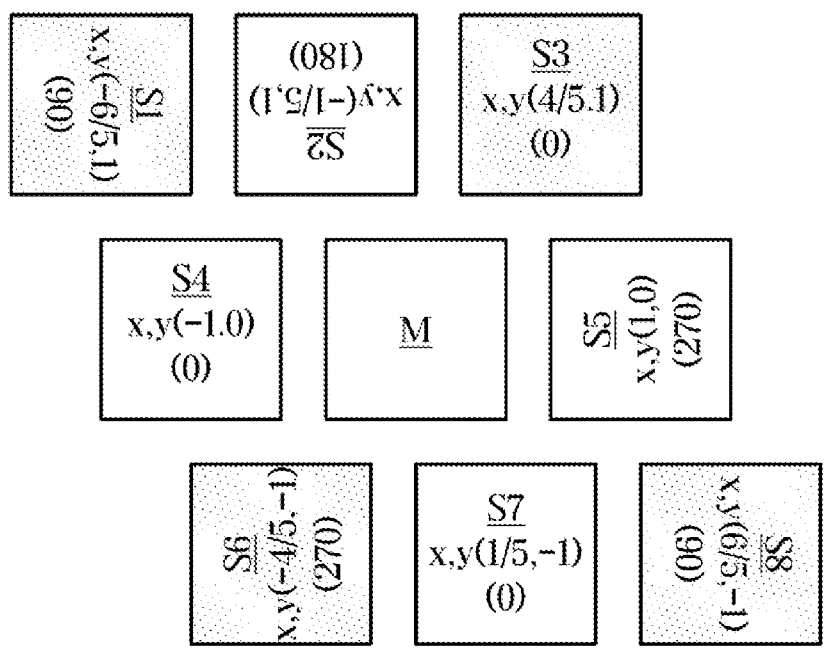
FIGS. 13 and 14 are views for describing various position information according to an embodiment.
Figure 14:
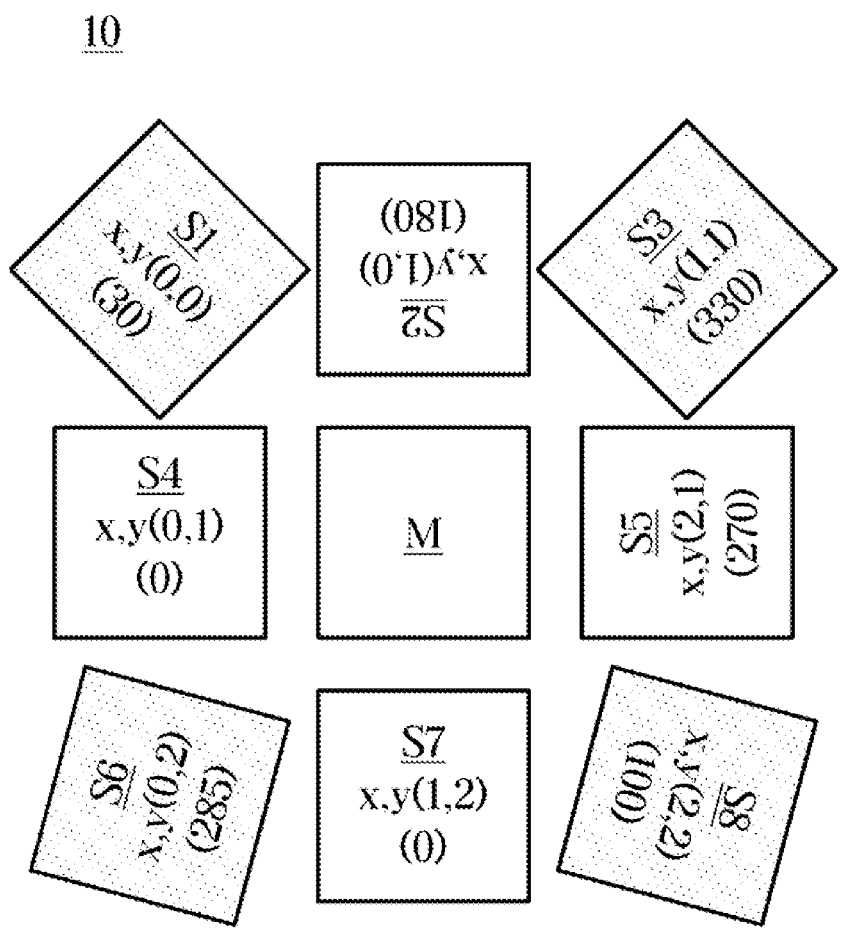

FIGS. 13 and 14 are views for describing various position information according to an embodiment.

Referring to FIG. 13, it illustrates that rows of the display apparatus 100 are arranged out of order. That is, in FIGS. 11 and 12, the rows of the display apparatus 100 are implemented so as not to be misaligned. However, since there is no limitation on the arrangement of the display apparatus 100, the display apparatus 100 may be arranged in the same manner as in FIG. 13. Therefore, the xy index included in the position information determined by each display apparatus is not limited to an integer and may be determined in a rational range. For example, in FIG. 13, when the xy index of the master display apparatus is (0, 0), the xy index of S3 may be determined as (1, ⅘).

Referring to FIG. 14, the display apparatus 100 including various rotation angles is illustrated. In general, in the case of a multi-display, it may be arranged in a form of stacking blocks, but it may be arranged at various angles as needed. In this case, the angle included in the position information that can be determined by each display apparatus is not limited. For example, in the case of S3 illustrated in FIG. 14, it is inclined by 330 degrees with respect to the master display apparatus. In this case, S3 may determine its own rotation information as (330).

As described with reference to FIGS. 13 and 14, there is no limitation on position information that can be calculated by each display apparatus.

Figure 15:
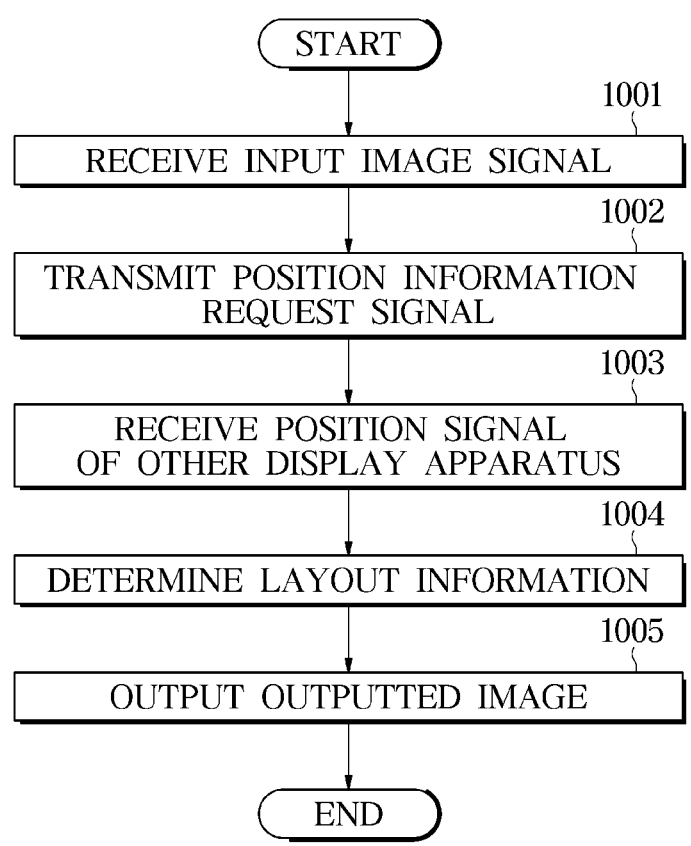
FIGS. 15 and 16 are flowcharts according to an embodiment.
Figure 16:
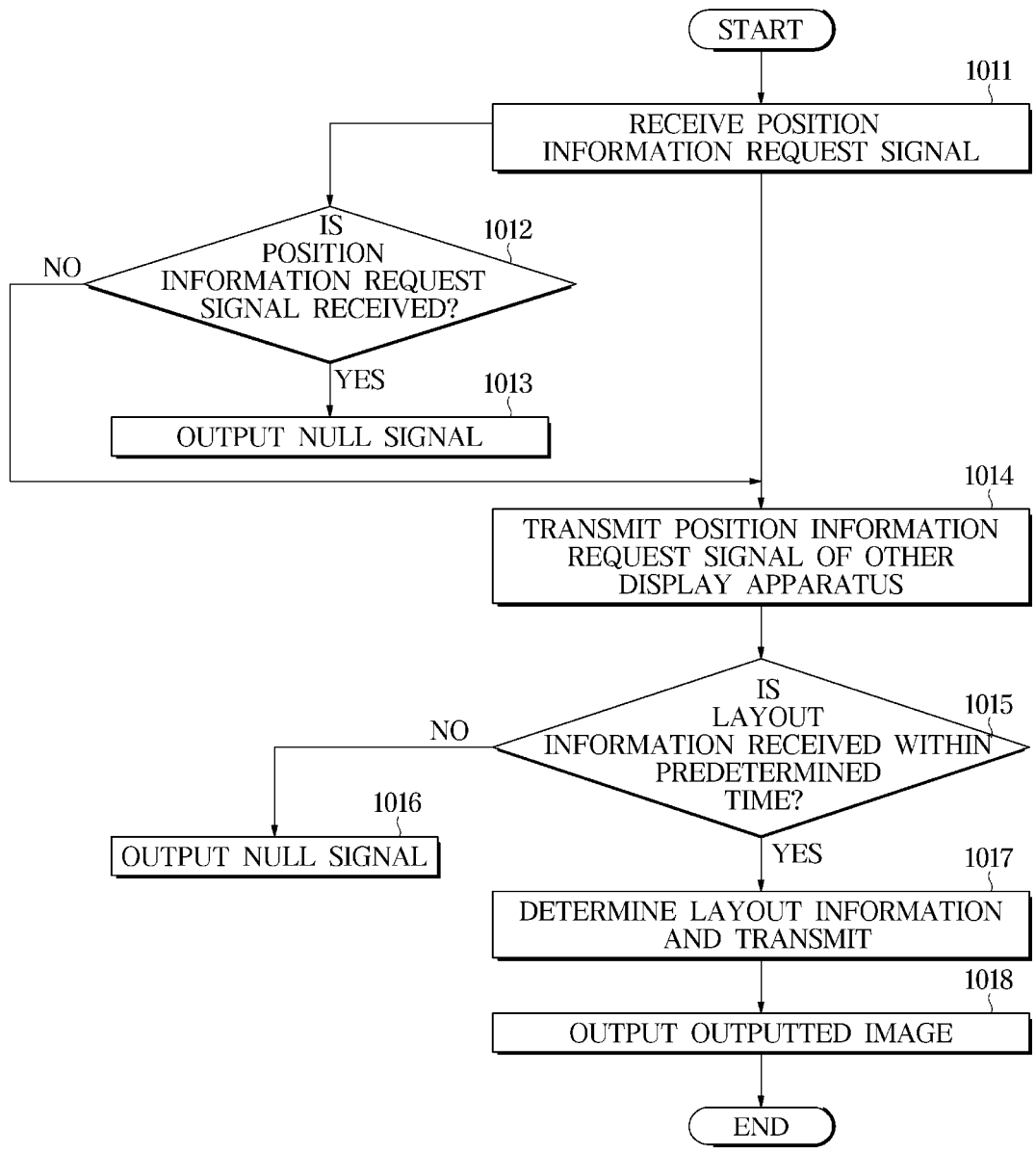

FIGS. 15 and 16 are flowcharts according to an embodiment.

FIG. 15 is a flowchart of an operation of a master display apparatus according to an embodiment.

The display apparatus 100 may receive the input image signal (1001). The display apparatus 100 may transmit the position information request signal to the other display apparatus (1002). Also, the display apparatus 100 may receive the position signal of the other display apparatus (1003). The display apparatus 100 may determine total layout information based on the position information or the received layout information (1004). The display apparatus 100 may output an output image based on the layout information (1005).

FIG. 16 is a flowchart illustrating an operation of a slave display apparatus according to an embodiment.

The display apparatus 100 may receive the position information request signal (1011). Thereafter, when another position information request signal is received (1012), the display apparatus 100 may output the null signal (1013). The display apparatus 100 may transmit the position information request signal of the other display apparatus (1014). When the layout information is received from the other display apparatus, the layout information including its position information may be determined and the layout information may be transmitted (1017).

Figure 17:
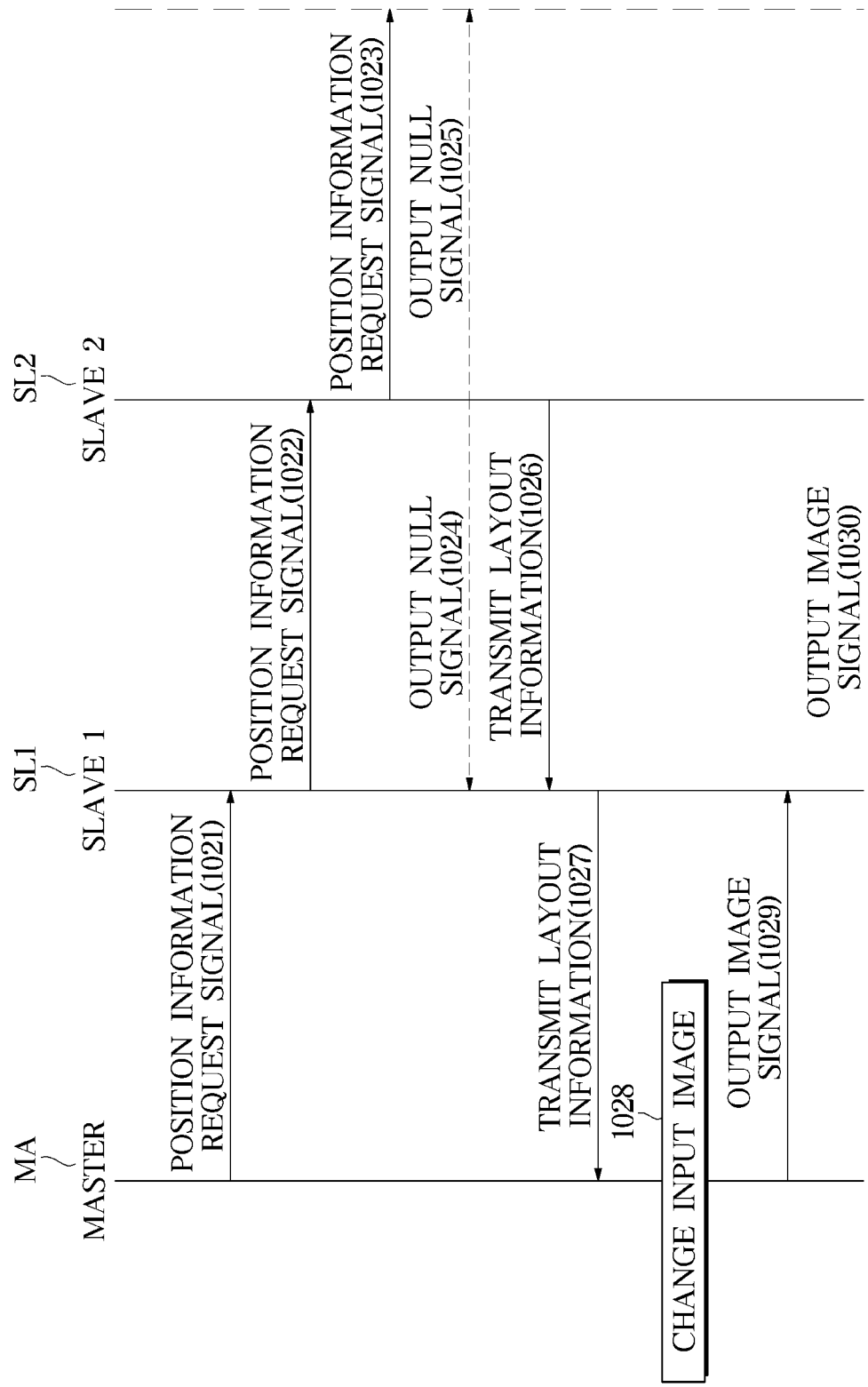
FIG. 17 is a signal flow view of a display system according to an embodiment.

FIG. 17 is a signal flow view of a display system according to an embodiment.

Referring to FIG. 17, the master display apparatus may transmit the position information request signal to the slave display apparatus (1021). The slave display apparatus may transmit the position information request signal to the other slave device (1022). Meanwhile, the slave display apparatus may receive the plurality of position information request signals, or may output the null signal if no signals are received for the predetermined time (1024, 1025).

Meanwhile, the slave apparatus may transmit the layout information (1026), and the slave display apparatus receiving the layout information may transmit the layout information that combines its position information and the received layout information to the master display apparatus (1027).

The master display apparatus may change the input image based on the layout information and output the output image signal (1028), and may transmit the output image signal to the slave display apparatus (1029, 1030).

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. A display apparatus comprising:
   a signal receiver configured to receive an input image signal;
   a display;
   a communication interface configured to communicate with at least one other display apparatus; and
   a controller configured to:
      determine position information of the display apparatus,
         determine position information of the at least one other display apparatus, the positon information of the at least one other display apparatus including rotation information of the at least one other display apparatus,
         control the display to display an image corresponding to the input image signal based on the position information of the display apparatus and the position information of the at least one other display apparatus, and
         transmit an output image signal corresponding to the input image signal to the at least one other display apparatus through the communication interface of the display apparatus based on the position information of the at least one other display apparatus,
      wherein the controller is configured to receive a position information request signal from the at least one other display apparatus through the communication interface and transmit the position information of the display apparatus to the at least one other display apparatus through the communication interface in response to the position information request signal being received.

2. The display apparatus according to claim 1, wherein the controller is configured to:
   determine the position information of the display apparatus as reference position information; and
   determine the position information of the at least one other display apparatus based on the reference position information.

3. The display apparatus according to claim 1,
wherein the controller is configured to:
determine layout information based on the position information of the display apparatus and the position information of the at least one other display apparatus; and
determine the output image signal by changing the input image signal based on the layout information.

4. The display apparatus according to claim 1, wherein the controller is configured to transmit a position information request signal to the at least one other display apparatus.

5. The display apparatus according to claim 4, wherein the controller is configured to determine the position information of the at least one other display apparatus based on a transmission direction of the position information request signal.

6. The display apparatus according to claim 4, wherein, in response to layout information corresponding to the transmitted position information request signal being received in excess of a predetermined time, the controller is configured to output a null signal corresponding to the transmitted position information request signal.

7. The display apparatus according to claim 1, wherein the controller is configured to determine the position information of the display apparatus based on a reception direction of the position information request signal from the at least one other display apparatus.

8. The display apparatus according to claim 1, wherein the controller is configured to output a null signal in response to another position information request signal received after a time when the position information request signal is received.

9. The display apparatus according to claim 1, wherein the controller is configured to determine the position information of the display apparatus based on the position information of the at least one other display apparatus.

10. The display apparatus according to claim 1, wherein the controller is configured to transmit at least some of layout information derived based on the position information of the display apparatus and the position information of the at least one other display apparatus to the at least one other display apparatus.

11. A method of controlling a display apparatus comprising:
receiving an input image signal;
determining position information of the display apparatus;
determining position information of at least one other display apparatus, the positon information of the at least one other display apparatus including rotation information of the at least one other display apparatus;
displaying, by a display of the display apparatus, an image corresponding to the input image signal based on the position information of the display apparatus and the position information of the at least one other display apparatus;
transmitting an output image signal corresponding to the input image signal to the at least one other display apparatus through a communication interface of the display apparatus based on the position information of the at least one other display apparatus; and
receiving a position information request signal from the at least one other display apparatus through the communication interface and transmitting the position information of the display apparatus to the at least one other display apparatus through the communication interface in response to the position information request signal being received.

12. The method according to claim 11,
wherein the determining of the position information of the display apparatus comprises determining the position information of the display apparatus as reference position information, and
wherein the determining of the position information of the at least one other display apparatus comprises determining the position information of the at least one other display apparatus based on the reference position information.

13. The method according to claim 11, further comprising:
determining layout information based on the position information of the display apparatus and the position information of the at least one other display apparatus; and
determining the output image signal by changing the input image signal based on the layout information.

14. The method according to claim 11, further comprising transmitting a position information request signal to the at least one other display apparatus.

15. The method according to claim 11, wherein the determining of the position information of the display apparatus comprises determining the position information of the display apparatus based on a reception direction of the position information request signal from the at least one other display apparatus.

16. The method according to claim 11, further comprising outputting a null signal in response to another position information request signal received after a time when the position information request signal is received.

17. The method according to claim 11, wherein the determining of the position information of the display apparatus comprises determining the position information of the display apparatus based on the position information of the at least one other display apparatus.

18. The method according to claim 11, further comprising transmitting at least some of layout information derived based on the position information of the display apparatus and the position information of the at least one other display apparatus to the at least one other display apparatus.

* * * * *